US009841983B2

(12) United States Patent
Jain

(10) Patent No.: US 9,841,983 B2
(45) Date of Patent: Dec. 12, 2017

(54) SINGLE CLICK HOST MAINTENANCE

(71) Applicant: VMware, Inc., Palo Alto, CA (US)

(72) Inventor: Puneet Kumar Jain, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 323 days.

(21) Appl. No.: 13/931,516

(22) Filed: Jun. 28, 2013

(65) Prior Publication Data

US 2015/0007174 A1    Jan. 1, 2015

(51) Int. Cl.
*G06F 9/455* (2006.01)

(52) U.S. Cl.
CPC ............... *G06F 9/45533* (2013.01); *G06F 2009/45562* (2013.01)

(58) Field of Classification Search
CPC ............ G06F 9/45533; G06F 9/45558; G06F 2009/4557; G06F 2009/45562
USPC .......................................................... 718/1
See application file for complete search history.

(56) References Cited

U.S. PATENT DOCUMENTS

| 7,640,292 | B1* | 12/2009 | Smoot | G06F 9/45558 709/202 |
| 8,694,638 | B2* | 4/2014 | Elyashev | 709/226 |
| 9,015,325 | B2* | 4/2015 | Abbondanzio et al. | 709/226 |
| 2006/0010176 | A1* | 1/2006 | Armington | 707/204 |
| 2006/0107087 | A1* | 5/2006 | Sieroka | G06F 9/4856 714/4.1 |
| 2007/0260831 | A1* | 11/2007 | Michael | G06F 9/4401 711/162 |
| 2009/0113423 | A1* | 4/2009 | Hiltgen et al. | 718/1 |
| 2009/0265706 | A1* | 10/2009 | Golosovker | G06F 9/4856 718/1 |
| 2009/0300606 | A1* | 12/2009 | Miller et al. | 718/1 |
| 2010/0161922 | A1* | 6/2010 | Sharp et al. | 711/162 |
| 2011/0179415 | A1* | 7/2011 | Donnellan et al. | 718/1 |
| 2012/0110237 | A1* | 5/2012 | Li et al. | 711/6 |
| 2013/0080387 | A1* | 3/2013 | Mohl | G06F 17/30233 707/624 |
| 2013/0191347 | A1* | 7/2013 | Bensinger | 707/649 |

(Continued)

OTHER PUBLICATIONS

Wolf, Chris. "Let's Get Virtual: A Look at Today's Server Virtualization Architectures." Burton Group Data Center Strategies-In-Depth Overview, Version 1 (2007), pp. 1-42.*

(Continued)

*Primary Examiner* — Meng An
*Assistant Examiner* — Willy W Huaracha
(74) *Attorney, Agent, or Firm* — Patterson & Sheridan LLP

(57) ABSTRACT

Techniques to facilitate virtual machine (VM) host maintenance are disclosed. A host requiring maintenance is converted to a VM running on another host which satisfies certain requirements, such as having sufficient resources and the same network connectivity as the host requiring maintenance. As part of this physical-to-virtual conversion, or after said conversion, the VM may be synchronized to the host requiring maintenance, such that the CPU state and memory contents of the VM and host are identical. Active control may then be passed to the VM, and the host powered down for the maintenance. After maintenance is completed and the host powered back on, virtual-to-physical conversion may be applied to convert the VM back to the host. The host may then be synchronized to the VM, and active control passed back to the host.

9 Claims, 4 Drawing Sheets

(56) References Cited

U.S. PATENT DOCUMENTS

2014/0130044 A1* 5/2014 Zhang ................ G06F 9/45533
718/1
2016/0034289 A1* 2/2016 Amano ................ G06F 11/30
718/1

OTHER PUBLICATIONS

Rodney Haywood "Proven Practice : Migration Methodology" Nov. 28, 2009, VMware Communities, pp. 1-16 Online address: "https://communities.vmware.com/docs/DOC-11462".*

* cited by examiner

US 9,841,983 B2

SINGLE CLICK HOST MAINTENANCE

BACKGROUND

Computer virtualization is a technique that involves encapsulating a physical computing machine in a virtual machine (VM) that is executed under the control of virtualization software running on a hardware computing platform, or "host." A group of hardware computing platforms may be organized as a cluster to provide resources for VMs. In a data center, it is common to virtualize hundreds, even thousands of VMs running on multiple clusters of host servers.

At times, a host running a set of VMs may undergo maintenance, including replacing faulty hardware components, replacing out-of-warranty hardware components with new components, upgrading firmware, upgrading installed software and applications, physically moving hardware, and installing new hardware components, among other things. Such maintenance can require VMs running on the host to be stopped, i.e., require VM downtime. One approach for eliminating such downtime uses live migration to move the VMs onto other hosts, after which maintenance is performed, and migrating the VMs back to the original host. Typically, this requires a system administrator to manually select migration targets to ensure that network connectivity and other resources needed by the VMs are not disrupted by the live migrations. This can be information intensive and tedious, as a large number of VMs (e.g., 100s) may run on the host server. Further, the system administrator may have to keep track of the migrated VMs and move those VMs back to the original host after the maintenance is performed.

SUMMARY

Embodiments presented herein provide techniques for virtual machine host maintenance. The techniques include receiving a selection of a first host system hosting at least a first VM, the first host system being a physical computing server which requires maintenance. The techniques further include identifying a second host system which satisfies requirements for performing a physical-to-virtual conversion of the first host system to a first VM running on the second host system. In addition, the techniques include performing the physical-to-virtual conversion of the first host system to the first VM, passing active control from the first host system to the first VM, and shutting down the first host system for the maintenance.

Further embodiments of the present invention include a computer-readable storage medium storing instructions that when executed by a computer system cause the computer system to perform one or more of the techniques set forth above, and a computer system programmed to carry out one or more of the techniques set forth above.

DETAILED DESCRIPTION

Embodiments presented herein provide techniques to facilitate virtual machine (VM) host maintenance. In one embodiment, the host requiring maintenance is converted to a VM running on another host which satisfies certain requirements for the conversion, including having sufficient resources and the same network connectivity as the host requiring maintenance. In general, physical-to-virtual conversions may include migrating the host's operating system, applications, and data to the VM. In one embodiment, the physical-to-virtual conversion may include migrating a hypervisor of the host and VMs running on the hypervisor, which may be treated as applications for purposes of the migration. As part of the physical-to-virtual conversion, or after said conversion, the VM to which the host is converted may be synchronized to the host itself, such that the CPU state and memory contents of the VM and host are identical. Active control may then be passed to the VM, and the host can be powered down for maintenance. After completing the maintenance and powering the host back on, virtual-to-physical conversion may be applied to convert the VM back to the host. The host may then be synchronized to the VM to which the host was previously converted, and active control passed from the VM to the host.

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
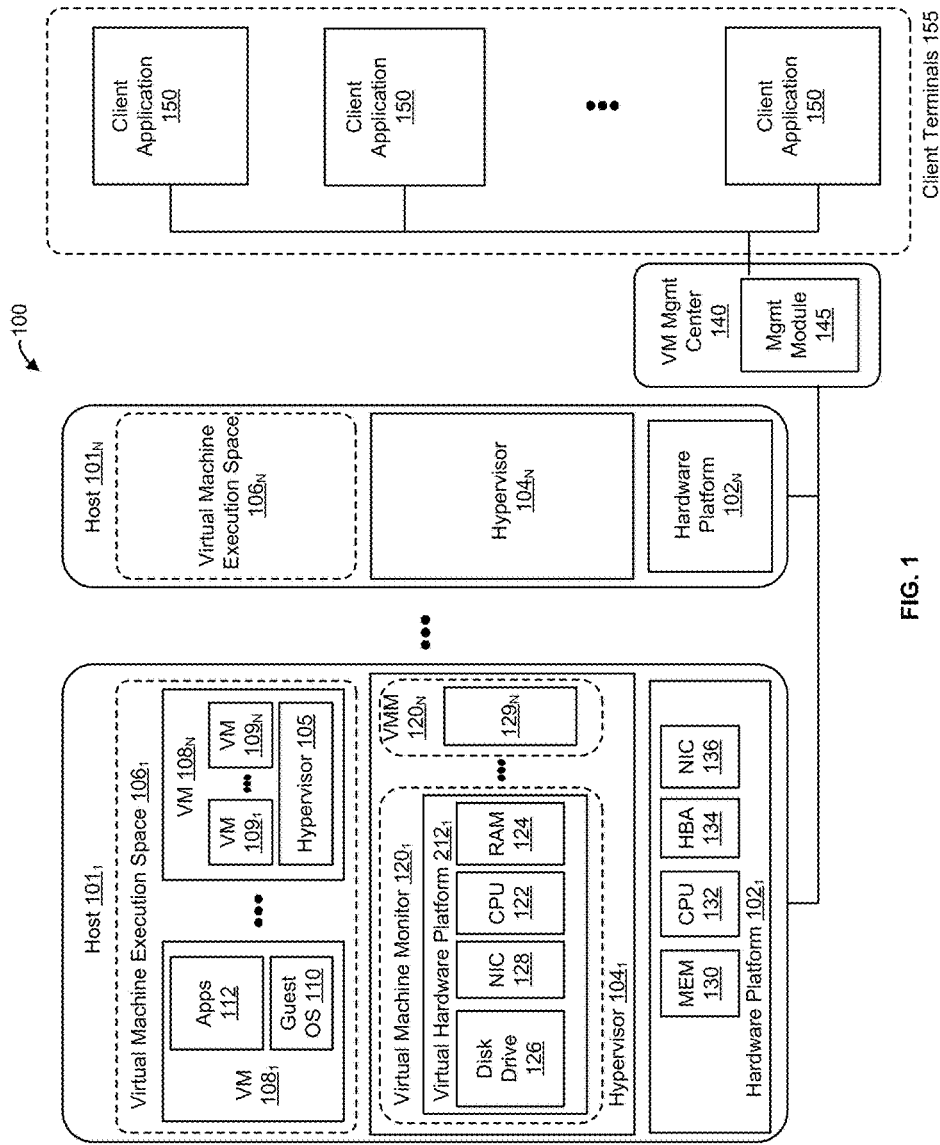
FIG. 1 depicts a block diagram of a server utilizing a virtualization architecture.

FIG. 1 illustrates a block diagram of a virtualized computer system 100 with which one or more embodiments of the present invention may be utilized. As illustrated, virtualized computer system 100 includes one or more host computers $101_{1-N}$ and a virtual machine management center 140. For clarity, only a first host computer $101_1$ is shown in detail.

Host computers $101_{1-N}$ are configured to support virtualized environments and to deliver one or more application services related to information technology, including but not limited to, web services, database services, data processing services, and directory services. In larger systems, a plurality of host computers $101_{1-N}$ may form a data center. Each of host computers $101_{1-N}$ provides a virtualization layer that abstracts processor, memory, storage, and/or networking resources into multiple virtual machines (VMs) that run concurrently thereon.

Illustratively, host computer $101_1$ includes conventional components of a computing device, such as a memory 130, a processor 132, a disk interface 134, and a network interface 136. Disk interface 134, which may be a "host bus adapter" (HBA), connects host computer 104 to storage devices such as a storage area network (SAN) device 110. Network interface 136, which may be a "network interface controller" (NIC), connects host computer 104 to a network and in some embodiments, to storage devices, such as a network attached storage (NAS) device.

As shown, one or more virtual machines VMs $108_{1-N}$ are configured within host computer $101_1$, and share the hardware resources of host computer $101_1$. The virtual machines run on top of a software interface layer $104_1$ (also referred to herein as a "hypervisor") that enables sharing of the hardware resources of host computer $101_1$ by the VMs $108_{1-N}$. Hypervisor $104_1$ may run on top of the operating system of host computer $101_1$ or directly on hardware components of host computer $101_1$. As also shown, each VM $108_{1-N}$ has a corresponding virtual machine monitor (VMM) $120_{1-N}$ provided in hypervisor $104_1$, that provides a virtual hardware platform for corresponding VMs. For clarity, only a first VMM $120_1$ is shown in detail. As shown, emulated hardware of VMM $120_1$ includes a virtual processor 122, a virtual memory 124, a virtual disk 126, and a virtual NIC 128.

Each VM $108_{1-N}$ may include a guest operating system (OS) and one or more guest applications running on top of the guest OS. As shown, VM $108_1$ includes guest OS 110 and applications 112 running thereon. Using physical-to-virtual conversion, the operating system, applications, and data of a physical computing system may be migrated to a VM. That is, the physical computing system may be converted to a VM. Publicly available physical-to-virtual conversion tools include VMware® vCenter™ Converter™. In one embodiment, physical-to-virtual conversion may be used to convert a VM host (e.g., one of hosts $101_{1-N}$) that requires maintenance to a VM running on another VM host that has sufficient resources and the same network connectivity as the converted VM host. During such a conversion, the VMs running on the host may be treated as applications, and their states copied to the other host. Illustratively, VM $108_N$ includes a migrated hypervisor 105, on which VMs $109_{1-N}$ run. Such a VM may also be synchronized to the host requiring maintenance, and active control passed to the VM so that the host may be powered down for maintenance. After the maintenance is completed and the host is powered back on, the contents of the VM may then be transferred back to the physical host using virtual-to-physical conversion, which is essentially the opposite of physical-to-virtual conversion. The physical host may then be synchronized with the VM, and active control passed back to the host.

VM management center 140 is a computer program in communication with each of host computers $101_{1-N}$ that carries out administrative tasks for virtualized computer system 100, such as managing the host computers, managing the virtual machines running within each host computer, provisioning the virtual machines, migrating virtual machines from one host computer to another, physical-to-virtual and virtual-to-physical conversions, allocating physical resources, such as processor and memory, load balancing between host computers, and so on. In one embodiment, VM management center 140 may reside and execute in central server(s). In an alternative embodiment, VM management center 140 may instead execute on one of host computers $101_{1-N}$ as a virtual machine. In a particular embodiment, VM management center 140 may be VMware® vCenter™. In another embodiment, VM management center 140 may abstract and pool resources managed by multiple management programs, each of which performs administrative tasks for a respective set of host computers, so that users may, e.g., create, use, and manage VMs hosted on any of the host computers via a web interface. For example, VM management center 140 may be a VMware vCloud® Director™.

Figure 2:
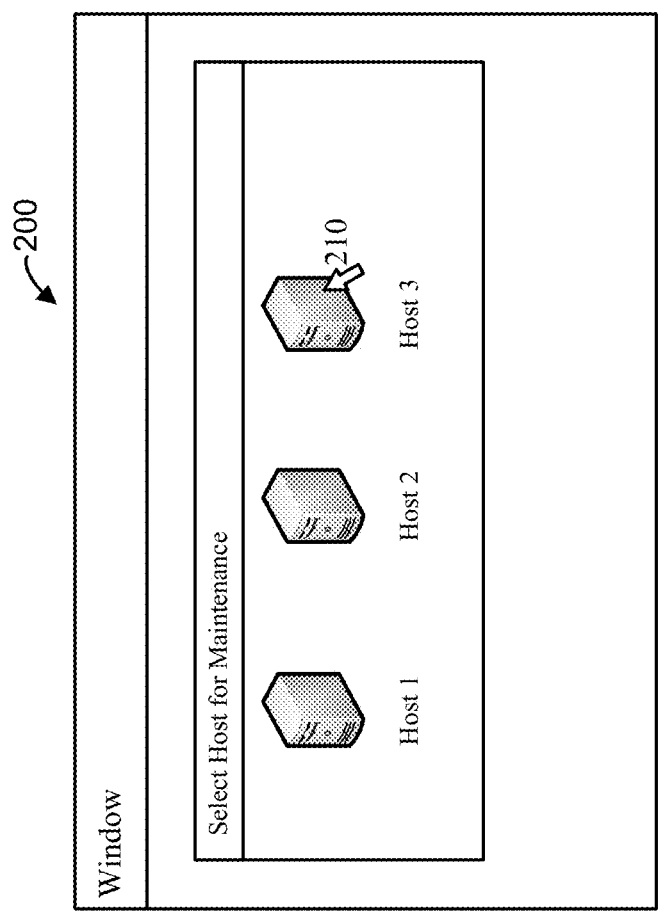
FIG. 2 illustrates a user interface for selecting a host which requires maintenance, according to an embodiment.

As noted, VM management center 140 may perform administrative tasks for virtualized computer system 100 autonomously, or may perform administrative tasks in response to commands issued by a system administrator. As described in greater detail below, a management module 145 of VM management center 140 may perform various functions during host maintenance, including identifying another host to which the host requiring maintenance may be transferred via a physical-to-virtual conversion, physical-to-virtual conversion of the host requiring maintenance, synchronizing the VM to which the host was converted to the host itself, and virtual-to-physical conversion of the VM back to the host after the maintenance. Management module 145 may further include instructions that present a graphical user interface or a command-line interface to the system administrator. In one embodiment, the interface presented by management module 145 may permit a host requiring maintenance to be selected with a single click as depicted in FIG. 2, which illustrates a user interface 200 for selecting the host requiring maintenance.

As shown, interface 200 is a graphical user interface which presents icons representing hosts managed via VM management center 140. By hovering mouse pointer 210 over one of the icons and clicking on the icon, a system administrator may indicate that maintenance is to be performed on the host associated with that icon. Upon receiving such a mouse click, management module 145 may identify another host to which the selected host may be transferred via a physical-to-virtual conversion, and perform said physical-to-virtual conversion to convert the selected host to a VM running on the other host. Note, if more than one host is identified, the physical-to-virtual conversion may automatically be performed to a most suitable of the identified hosts (based on, e.g., the host having the most free resources, or some other criteria). For example, VM management center 140 may provide, to the system administrator, an option to automatically convert selected hosts to the most suitable of identified hosts. Alternatively, user interface 200 may be made to display the multiple identified hosts, giving the system administrator a choice of which host to perform the physical-to-virtual conversion to. If, on the other hand, no hosts are successfully identified for the physical-to-virtual conversion, user interface 200 may be made to display an error message indicating that maintenance cannot be performed currently. In one embodiment, the error message may also include the reason why maintenance cannot be performed (e.g., no target for a physical-to-virtual conversion was identified).

As part of, or after, the physical-to-virtual conversion, management module 145 may synchronize the VM running on the other host to the selected host. Management module 145 may then transfer active control to the VM and power down the selected host. Thereafter, maintenance may be performed on the selected host to, e.g., replace faulty hardware components, replace out-of-warranty hardware components, upgrade firmware, physically move hardware, install new hardware components, upgrade installed software and applications, etc. After the maintenance is completed, management module 145 may identify, or be notified, when the selected host original host is powered back on. Management module 145 may then perform a virtual-to-physical conversion of the VM back to the selected host, synchronize that host to the VM, and transfer active control to the host.

Figure 3:
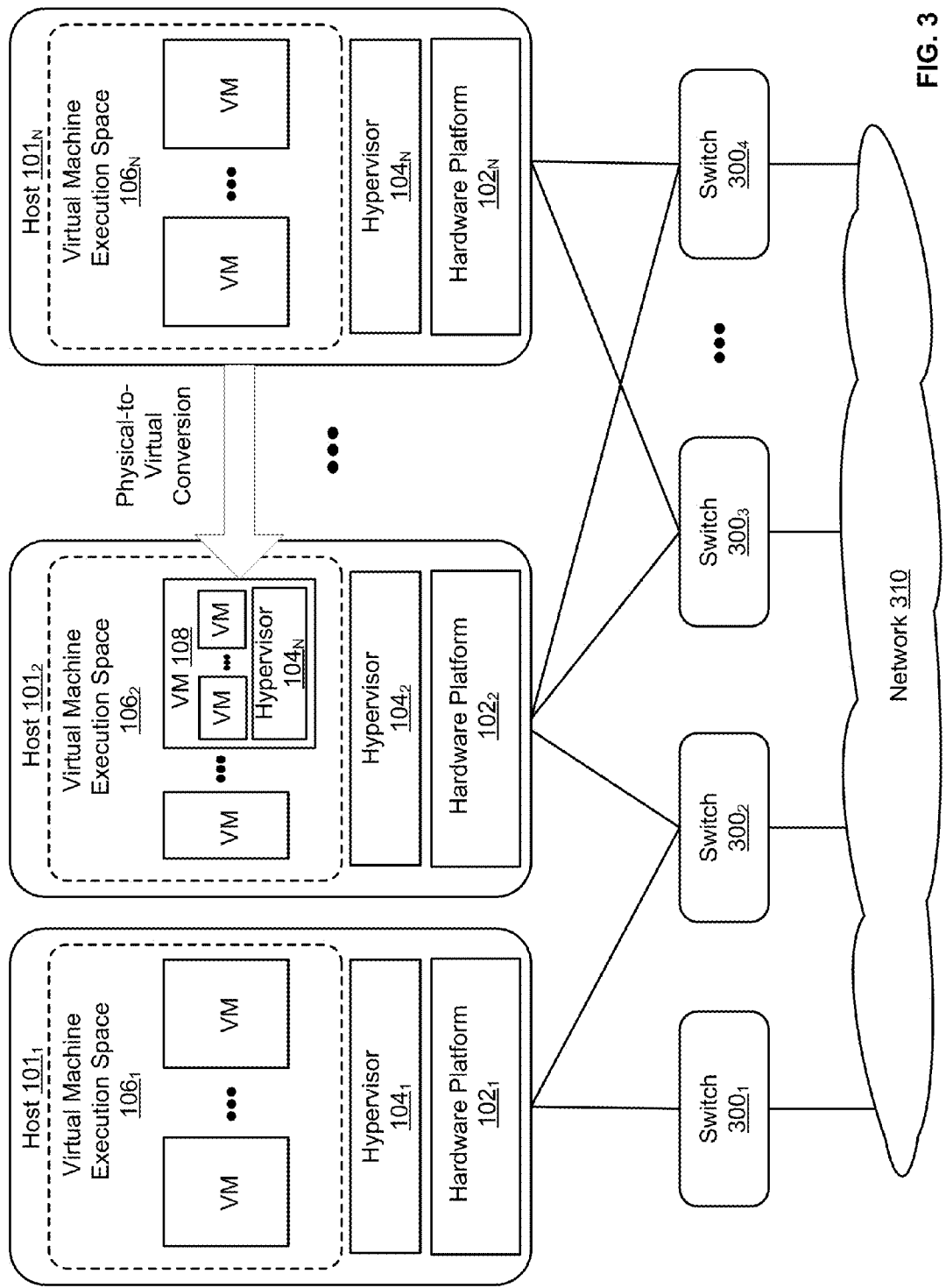
FIG. 3 illustrates an approach for single-click host maintenance, according to an embodiment.

FIG. 3 illustrates an approach for single-click host maintenance, according to an embodiment. As discussed, management module 145 running on VM management center 140 may provide a user interface which permits a system administrator to indicate a VM requiring maintenance. Illustratively, assume host $101_N$ has been indicated by the system administrator as requiring maintenance using, e.g., the user interface depicted in FIG. 2. For example, a hardware component may be faulty or out-of-date, requiring physical intervention to replace the component. Management module 145 may then identify an available host to which to transfer the host $101_N$ using physical-to-virtual conversion. In one embodiment, the host may be identified as one having sufficient resources (e.g., memory, network bandwidth, etc.) and the same network connectivity as the host requiring maintenance, where having the same network connectivity includes being connected to the same physical switches (e.g., hosts $101_{2-3}$ are connected to the same switches $300_{3-4}$). The requirements of having sufficient resources and the same network connectivity ensure that the physical-to-virtual conversion can be performed and VMs running on the host will not suffer disruptions as a result of said conversion. For example, the host may be a development server requiring a large quantity of memory (e.g., 1 Tb of memory), and the management module 145 may identify another host having at least that amount of free memory. As another example, VMs running on the host may require high network bandwidth (e.g., 10 Gb network connectivity), and the management module 145 may identify another host which can provide such bandwidth.

After successfully identifying the other host, management module 145 may convert the host requiring maintenance to a VM running on the host. As noted above, if multiple hosts are identified, physical-to-virtual conversion may automatically be performed to a most suitable of the identified hosts. Alternatively, the multiple identified hosts may be presented to a system administrator via a user interface, giving the system administrator a choice of candidate hosts to perform the physical-to-virtual conversion to. If, on the other hand, no hosts are successfully identified, then an error message may be displayed indicating that maintenance cannot be performed currently, as well as the reason.

During the physical-to-virtual conversion itself, the VMs of the original host may be treated as applications running on the hypervisor and have their states copied to the new host, similar to applications running on operating systems being migrated in typical physical-to-virtual conversions. Management module 145 itself may perform this conversion, or invoke a physical-to-virtual conversion tool such as the VMware® vCenter™ Converter™ tool. As shown, host $101_3$ is converted to VM 108 running on host $101_2$. Management module 145 may also synchronize VM 108 and host $101_3$. The synchronization of VM 108 with host $101_3$ may include capturing processor and memory transitions on host $101_3$ as events, and applying those transitions to VM 108 in real time. That is, operation(s) performed on host $101_3$ are also performed on VM 108, such that the CPU state and memory contents of host $101_3$ and VM 108 are identical. A number of processors, including certain processors available from Intel Corp. and Advanced Micro Devices, Inc., provide hardware support for such synchronization. VM 108 and host $101_3$ may be synchronized as part of the physical-to-virtual conversion, or after it. In a particular embodiment, VMware® vLockstep™ may be invoked to synchronize VM 108 with host $101_3$.

After the physical-to-virtual conversion and synchronization, host $101_3$ is in an active state in which actual processing is performed by host $101_3$, whereas VM 108 is in a passive state that mirrors activity in host $101_3$. Management module 145 may transfer active control to VM 108. That is, VM 108 is brought into an active state and performs actual processing. At substantially the same time, management module 145 may bring host $101_3$ to a passive state mirroring VM 108. Then, management module 145 may power off host $101_3$ so that maintenance may be performed thereon. After maintenance is completed and host $101_3$ powered back on, management module 145 may identify that host $101_3$ is running and convert VM 108 back to host $101_3$ using virtual-to-physical conversion. Similar to physical-to-virtual conversion, virtual-to-physical conversion may generally include migrating the operating system, applications, and data of a VM to a physical computing system. Such migration in the context of VM hosts may include migrating the hypervisor and VMs running thereon from the VM (e.g., VM 108) to the host (e.g., host $101_3$). Host $101_3$ and VM 108 may be synchronized as part of the virtual-to-physical conversion, or after said conversion. Active control may then be passed back to host $101_3$.

Figure 4:
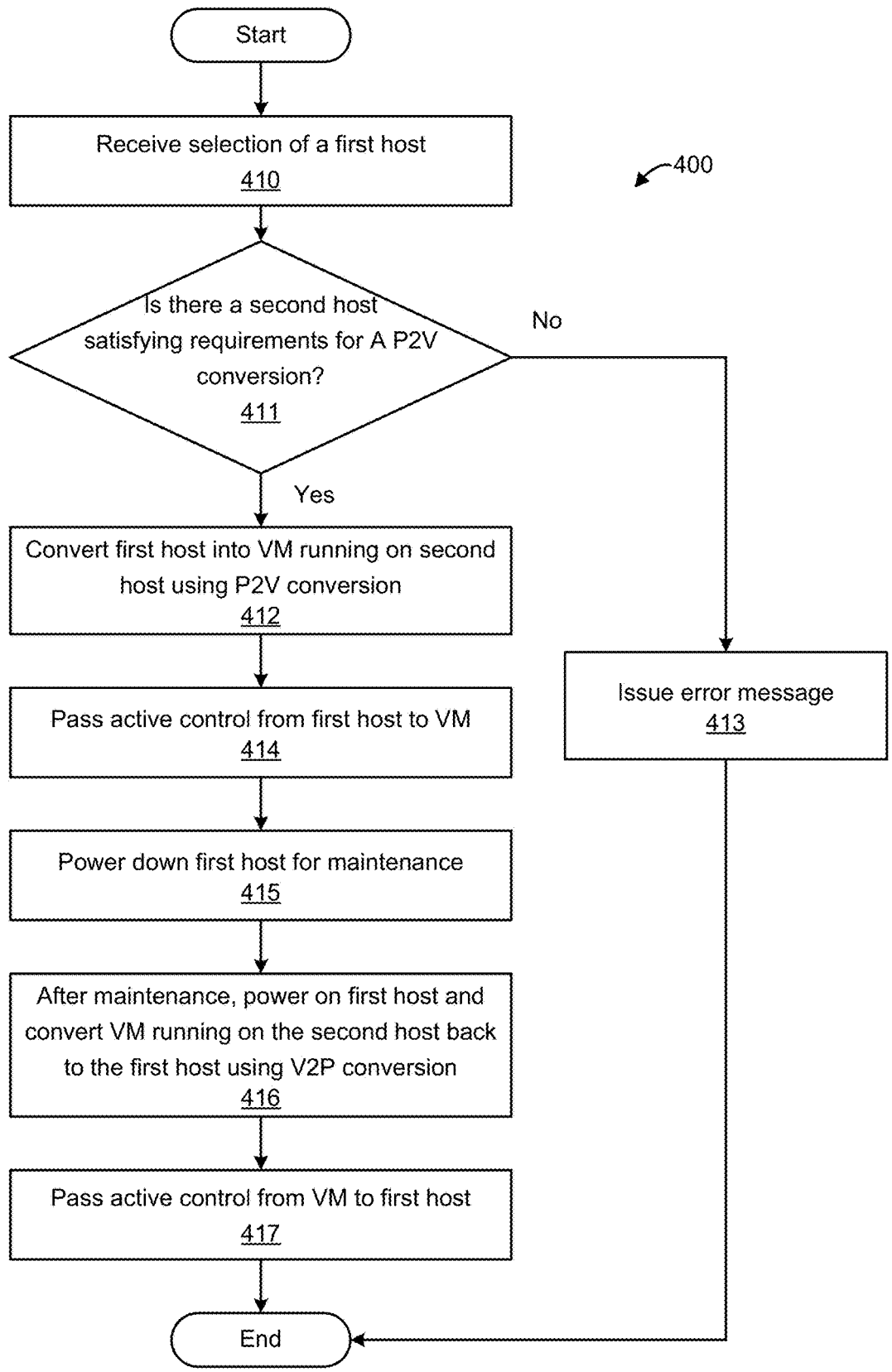
FIG. 4 illustrates a method for performing host maintenance, according to an embodiment.

FIG. 4 illustrates a method for performing host maintenance, according to an embodiment. As shown, the method 400 begins at step 410, where a host management module receives a selection of a first host on which maintenance is to be performed. In one embodiment, the selection may be as simple as a single click on a user interface, indicating the first host as requiring maintenance.

At step 411, the management module identifies a second host that satisfies requirements for a physical-to-virtual conversion of the first host. In one embodiment, the requirements may include having sufficient resources and the same network connectivity as the first host. Again, having sufficient resource may include the second host having adequate free memory, network bandwidth, etc., depending on the circumstances. Network connectivity requirements may include identifying a host connected to the same physical switches. As discussed, these requirements ensure the physical-to-virtual conversion can be performed successfully and VMs running on the host will not suffer disruptions as a result of said conversion.

If identification of the second host at step 411 is unsuccessful (i.e., no second host can be identified), then at step 413, the management module issues an error message notifying the system administrator that, currently, host maintenance for the selected host cannot be performed. In one embodiment, the management module may also issue additional details indicating the reason host maintenance cannot be performed. For example, the error message may state that no secondary host could be found for a physical-to-virtual conversion.

If, on the other hand, a second host is successfully identified at step 411, the management module converts the first host into a VM running on the second host at step 412. This physical-to-virtual conversion may include migrating the hypervisor and VMs of the first host to the VM running on the second host, and may be performed by the management module itself or by a conversion tool (e.g., VMware® vCenter™ Converter™) invoked by the management module. As part of the physical-to-virtual conversion, or after said conversion, the management module may synchronize the VM running on the second host to the first host. As discussed, synchronizing the VM to the first host may include capturing processor and memory transitions on the first host as events, and applying those transitions to the VM in real time so that the CPU state and memory contents of the VM and first host are identical. In a particular embodiment, VMware® vLockstep™ may be invoked to synchronize the VM with the host. As previously noted, multiple hosts may be identified for the physical-to-virtual conversion, in which case the conversion may automatically be performed to a most suitable of the identified hosts (e.g., based on the host having the most free resources, or some other criteria). Alternatively, the multiple identified hosts may be presented to a system administrator via a user interface, giving the system administrator a choice of candidate hosts to perform the physical-to-virtual conversion to.

At step 414, active control is passed from the first host to the VM running on the second host. Here, the management module may bring the VM into an active state in which the VM performs actual processing. Additionally, the management module may bring the first host to a passive state in which the host mirrors the activity of the VM.

Then, at step 415, the management module powers down the first host to enable maintenance to be performed thereon. Any feasible type of maintenance may be performed, including replacing faulty hardware components, replacing out-of-warranty hardware components, upgrading firmware, physically moving hardware, installing new hardware components, upgrading installed software and applications, etc.

After the maintenance is completed and the first host is powered back on, the management module may detect, or be notified, that the first host has been powered back on and, at step 416, transfer the VM running on the second host back to the first host using virtual-to-physical conversion. Such virtual-to-physical conversion may include migrating the hypervisor and VMs running thereon from the VM running on the second host to the first host. The first host may also be synchronized to the VM as part of the virtual-to-physical conversion, or after said conversion. Then, at step 418, active control is returned to the first host.

Advantageously, embodiments described herein permit automatic transfer of VMs from a host that requires maintenance to another host, which may be initiated by a single click in some embodiments. No VM downtime is suffered, and the system administrator need not manually migrate VMs before the maintenance, keep track of the migrated VMs, or migrate those VMs back to the original host after maintenance is completed.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A computer-implemented method for facilitating virtual machine (VM) host maintenance, comprising:
   receiving, from a user, a selection of a first host system hosting at least one VM, wherein the first host system is a physical computing system which requires maintenance;
   identifying a second host system which satisfies requirements for performing a physical-to-virtual conversion of the first host system to a first VM running in the second host system, wherein the requirements for performing the physical-to-virtual conversion include the second host system having sufficient resources and a same network connectivity as the first host system;
   performing the physical-to-virtual conversion of the first host system to the first VM running in the second host system, wherein, after the physical-to-virtual conversion, the first VM also hosts the at least one VM hosted by the first host system, and wherein after, or as part of, performing the physical-to-virtual conversion, the running first VM is synchronized with the first host system, the synchronization including capturing operations on the first host system as events and applying the captured operations to the running first VM in real time such that CPU states and memory contents of the first host system and the first VM are identical;

passing active control from the first host system to the first VM running in the second host system so that the first host system can be powered down for maintenance; and after the maintenance is performed on the first host system and the first host system is powered on:

performing a virtual-to-physical conversion of the first VM running in the second host system to the first host system, wherein after, or as part of, performing the virtual-to-physical conversion, the first host system is synchronized with the first VM, and passing active control from the first VM running in the second host system back to the first host system.

2. The computer-implemented method of claim 1, wherein the selection of the first host system is performed via a mouse click.

3. The computer-implemented method of claim 1, further comprising, if no host system satisfies the requirements for performing the physical-to-virtual conversion including having sufficient resources and the same network connectivity as the first host system, displaying a notification that maintenance on the first host system cannot currently be performed.

4. A non-transitory computer-readable storage medium embodying computer program instructions for performing operations for facilitating virtual machine (VM) host maintenance, the operations comprising:

receiving, from a user, a selection of a first host system hosting at least one VM, wherein the first host system is a physical computing system which requires maintenance;

identifying a second host system which satisfies requirements for performing a physical-to-virtual conversion of the first host system to a first VM running in the second host system, wherein the requirements for performing the physical-to-virtual conversion include the second host system having sufficient resources and a same network connectivity as the first host system;

performing the physical-to-virtual conversion of the first host system to the first VM running in the second host system, wherein, after the physical-to-virtual conversion, the first VM also hosts the at least one VM hosted by the first host system, and wherein after, or as part of, performing the physical-to-virtual conversion, the running first VM is synchronized with the first host system, the synchronization including capturing operations on the first host system as events and applying the captured operations to the running first VM in real time such that CPU states and memory contents of the first host system and the first VM are identical;

passing active control from the first host system to the first VM running in the second host system so that the first host system can be powered down for maintenance; and after the maintenance is performed on the first host system and the first host system is powered on:

performing a virtual-to-physical conversion of the first VM running in the second host system to the first host system, wherein after, or as part of, performing the virtual-to-physical conversion, the first host system is synchronized with the first VM, and passing active control from the first VM running in the second host system back to the first host system.

5. The computer-readable storage medium of claim 4, wherein the selection of the first host system is performed via a mouse click.

6. The computer-readable storage medium of claim 4, the operations further comprising, if no host system satisfies the requirements for performing the physical-to-virtual conversion including having sufficient resources and the same network connectivity as the first host system, displaying a notification that maintenance on the first host system cannot currently be performed.

7. A system, comprising:

a processor; and a memory, wherein the memory includes a program configured to perform operations for facilitating virtual machine (VM) host maintenance, the operations comprising:

receiving, from a user, a selection of a first host system hosting at least one VM, wherein the first host system is a physical computing system which requires maintenance, identifying a second host system which satisfies requirements for performing a physical-to-virtual conversion of the first host system to a first VM running in the second host system, wherein the requirements for performing the physical-to-virtual conversion include the second host system having sufficient resources and a same network connectivity as the first host system, performing the physical-to-virtual conversion of the first host system to the first VM running in the second host system, wherein, after the physical-to-virtual conversion, the first VM also hosts the at least one VM hosted by the first host system, and wherein after, or as part of, performing the physical-to-virtual conversion, the running first VM is synchronized with the first host system, the synchronization including capturing operations on the first host system as events and applying the captured operations to the running first VM in real time such that CPU states and memory contents of the first host system and the first VM are identical, passing active control from the first host system to the first VM running in the second host system so that the first host system can be powered down for maintenance, and after the maintenance is performed on the first host system and the first host system is powered on:

performing a virtual-to-physical conversion of the first VM running in the second host system to the first host system, wherein after, or as part of, performing the virtual-to-physical conversion, the first host system is synchronized with the first VM; and passing active control from the first VM running in the second host system back to the first host system.

8. The system of claim 7, wherein the selection of the first host system is performed via a mouse click.

9. The system of claim 7, the operations further comprising, if no host system satisfies the requirements for performing the physical-to-virtual conversion including having sufficient resources and the same network connectivity as the first host system, displaying a notification that maintenance on the first host system cannot currently be performed.

* * * * *